United States Patent Office.

HARVEY W. WILEY, OF WASHINGTON, DISTRICT OF COLUMBIA, ASSIGNOR TO THE MARSDEN COMPANY, OF PHILADELPHIA, PENNSYLVANIA.

METHOD OF MANUFACTURING EXPLOSIVES.

SPECIFICATION forming part of Letters Patent No. 673,347, dated April 30, 1901.

Application filed February 24, 1899. Serial No. 706,725. (No specimens.)

*To all whom it may concern:*

Be it known that I, HARVEY W. WILEY, a citizen of the United States, residing at Washington, in the District of Columbia, have invented certain new and useful Improvements in Methods of Manufacturing Explosives, of which the following is a specification.

In the preparation of the material I take vegetable pith—for instance, the pith of Indian corn—and comminute the same, preferably heating the pith, so as to secure the cellular part of the pith as far as possible free from moisture.

While dry pith will absorb about eight times its weight of nitroglycerin, I have found that as thus charged the liquid escapes too readily and that it is preferable to limit the absorption to from thirty-three per cent. to one hundred per cent. of the weight of the pith. This, however, it is difficult to do and secure a uniform result, some particles of the pith becoming fully saturated, while others take up but little of the liquid, the product being practically unfit for use.

After various experiments I have found that a uniform product cannot well be obtained without fully saturating every particle of pith and that then by pressure the excess can be removed, leaving any desired amount in the pith, thereby securing a dynamite consisting of particles of comminuted pith partially but uniformly charged with nitroglycerin.

Owing to the great viscidity and specific gravity of nitroglycerin, (about 1.6,) it is sometimes difficult to regularly saturate the particles of pith, and to overcome this objection I dilute the nitroglycerin or dissolve it in any suitable liquid of less specific gravity capable of being evaporated at a comparatively low temperature, thus securing a more fluid and dilute solution capable of ready absorption by the pith, and I then remove the volatile solvent by heat, recovering it for reuse in any suitable manner, and thus secure also the result of leaving in the cells of the pith only a limited quantity of nitroglycerin, while uniformly distributing the same in all parts of every pith particle. Among other solvents which may be employed are methyl-alcohol or wood-spirit, or, preferably, low-grade petroleum ether, which volatilizes at about from 45° to 70° centigrade and which is inexpensive and easily recovered and reused.

As illustrative of my mode of operation I would state that one hundred grams of nitroglycerin are dissolved in eight hundred grams of petroleum ether, and with this I saturate one hundred grams of pith. The mixture is then heated to from 45° to 75° centigrade until the volatile liquid is removed, when the pith will be found to be properly charged.

For many purposes, and especially for transportation, the material as it exists after the removal of the volatile liquid will be of undesirable bulk and its parts too far separated to secure maximum explosive results. I therefore compress the same, which may be done without expelling the liquid, until the mass is so consolidated that it will explode properly, while its bulk is thus so reduced that it may be commercially transported. I have found that the pith is a most satisfactory absorbent and that unlike many others it is free from any matter likely to affect the liquid. It is exceedingly combustible, so that it is consumed upon the explosion, leaving practically no ash or deposit, while it holds the particles of liquid so regularly and uniformly separated that it is a most satisfactory retainer, and the dynamite thus made has better keeping qualities and yields a higher detonating force than can be secured by the use of ether absorbents.

I am aware that pithy substances have heretofore been used for absorbing nitroglycerin; but in these cases the substances have been previously treated with an acid or alkali for the purpose of removing liquo-celluloses and pentosans and then compressed before the nitroglycerin is absorbed. By this method it is impossible to get a uniform distribution of the nitroglycerin to all parts of the mass, and especially an excess of nitroglycerin will exist at the surface of the compressed blocks, and thus the same is in the most dangerous condition to produce decompositions and explosions. In my process the nitroglycerin is previously dissolved in an appropriate solvent, in which condition it can be uniformly absorbed by the untreated natural pithy substance, and thus deposited in molecular contact with all parts of the absorbent material, thus securing a perfectly even distribution and avoiding any excess at the surface.

I claim as my invention—

In the manufacture of dynamite, comminuting vegetable pith, saturating the same with a solution of nitroglycerin in a volatile liquid and then removing the latter by evaporation, substantially as set forth.

In testimony whereof I have signed my name to this specification in the presence of two subscribing witnesses.

HARVEY W. WILEY.

Witnesses:
M. S. TIDD,
M. L. DALLAS.